United States Patent Office 3,334,059
Patented Aug. 1, 1967

3,334,059
STABILIZED POLYVINYL ACETATE LATEX PAINTS CONTAINING COMPOSITE PIGMENT OF TITANIUM DIOXIDE AND ANHYDRITE
Warren Rodgers and William Swartz, St. Louis, Mo., assignors to National Lead Company, New York, N.Y., a corporation of New Jersey
No Drawing. Filed Feb. 11, 1964, Ser. No. 343,949
9 Claims. (Cl. 260—29.6)

This invention relates in general to the preparation of latex paints. More specifically it relates to an improved polyvinyl acetate latex paint formulation and method for producing the same.

Various types of latex paint systems have been used commercially for a number of years. Among the most widely used are those which employ butadiene styrene, acrylic and polyvinyl acetate as bases. Titanium dioxide pigments, both anatase and rutile, have been used widely as the opacifying agent in such latex paint systems.

In general the actual paint formulations are rather complex since various agents are added to perform various functions in the paint systems. These various agents added may include dispersing and wetting agents, protective colloids, defoamers, coalescing agents, freeze-thaw agents, fungicides and extenders.

Many naturally occurring products such as mica, clay, talc and diatomaceous silica are added to the paint systems as extenders in order to lower the cost of the formulations. These extenders have little or no hiding power but when used in conjunction with an opacifying agent form the necessary pigment volume concentration in the paint system.

It would be desirable, however, to prepare a latex paint utilizing a coalesced composite pigment of titanium dioxide and anhydrite instead of a pure titanium dioxide pigment as the opacifying agent since the anhydrite in the composite pigment is of a very small particle size and its use in a latex formulation would be an advantage since it is difficult to obtain a naturally occurring extender which possesses such fine particle size.

It has been found, however, that when a composite $TiO_2$-anhydrite pigment is substituted for a pure $TiO_2$ pigment plus a naturally occurring extender, the anhydrite which is anhydrous calcium sulfate has a slight solubility in water and the solubilized calcium values tend to react with the various agents added to the formulation and these agents, therefore, no longer function in the manner in which they are supposed to act since they are rendered inactive by the solubilized calcium values.

With respect to polyvinyl acetate paint systems, the polyvinyl acetate itself tends to form acetic acid upon standing which in turn causes a breakdown of the paint system. Moreover, when using a composite anhydrite pigment in these systems the anhydrite values in the composite pigment slowly dissolve in the presence of the acetic acid and convert from small size anhydrite to large size gypsum crystals which ruin the properties of the paint system.

An object of the instant invention, therefore, is to prepare a polyvinyl acetate latex paint which utilizes a composite pigment of titanium dioxide and anhydrite which is stable upon standing. A further object is to employ a composite pigment of titanium dioxide and anhydrite in a polyvinyl acetate latex paint system in which the anhydrite does not convert to gypsum. These and other objects will become apparent from the following more complete description of the instant invention.

Broadly, the instant invention relates to an improved polyvinyl acetate latex paint formulation, said formulation containing a non-ionic surface active agent, a coalesced composite pigment of titanium dioxide and anhydrite and a stabilizing agent, said composite pigment containing from 25% to 60% titanium dioxide by weight of said composite pigment, said stabilizing agent selected from the group consisting of calcium silicate, barium silicate, strontium silicate, magnesium oxide, magnesium hydroxide, calcium oxide and calcium hydroxide, the minimum amount of said stabilizing agent being from 0.1% for magnesium oxide and calcium oxide, 0.25% for magnesium hydroxide and calcium silicate and 1.0% for barium silicate, strontium silicate and calcium hydroxide, the maximum amount not to exceed 6%, said amounts based on the weight of said composite pigment.

The coalesced composite pigment consisting of titanium dioxide and anhydrite which is employed in the instant invention contains from 25% to 60% $TiO_2$ based on the weight of the composite pigment. The anhydrite portion of the composite pigment has an average particle size of less than 1 micron and preferably between 0.3 and 0.7 micron. The particle size of the anhydrite employed was determined by a method and apparatus which are similar to the ones described by C. L. Gooden and C. M. Smith in their publication in Ind. Eng. Chem., Anal. E 12, 470 (1940).

This type of anhydrite may be prepared by a variety of methods provided sufficient precautions are taken regarding the particle size of the lime, limestone or gypsum employed, the concentration of the sulfuric acid used, the type of slurry employed, the rate of addition and the heating cycle employed. One particularly successful method for producing this small size anhydrite necessary for the instant invention is that described in detail in U.S. Patent No. 2,956,859, issued Oct. 18, 1960 to W. Rodgers et al. which is assigned to the same assignee as the instant invention. In the Rodgers et al. patent, the anhydrite is prepared by first forming an anhydrite seed by adding a minor portion of gypsum to 74% to 80% $H_2SO_4$ at a temperature from 20° C. to 70° C. said gypsum added at a rate of from 0.0125 to 1.0 part gypsum per minute for each part of acid. The remaining gypsum is then added to the anhydrite seed and the mixture is heated from 80° C. to boiling to convert all of the gypsum to anhydrite. The anhydrite prepared in this manner will have an average particle size of 0.3 to 0.7 micron.

The "coprecipitated or coalesced" titania hydrate-anhydrite mixture is produced by admixing a slurry of 15% to 40% anhydrite, formed in the manner described above for example, with a titanium sulfate solution, and heating the mixture to boiling to hydrolyze the titanium values in the presence of the anhydrite.

The coalesced titania hydrate-anhydrite mixture thus produced is then deliquored, washed, bleached and calcined in the usual manner to produce the coalesced composite pigment of titanium dioxide and anhydrite.

Using a composite pigment in a polyvinyl acetate latex paint formulation it has been found necessary to add a stabilizing agent to the system both to prevent the anhydrite portion of the composite pigment from dissolving and reacting with the various agents added, and to prevent the anhydrite from converting to gypsum.

If the stabilizing agent is not added to the system when a composite pigment is employed, the various agents added to the paint are rendered inactive by reaction with the solubilized calcium ions which breaks down the paint system thus resulting in a short shelf life. In addition the stabilizing agent prevents the anhydrite from converting to gypsum, the presence of which would ruin the properties of the paint.

The stabilizing agent may be added either to the paint system or admixed with the composite pigment itself. Apparently it is not critical how the stabilizer is added.

In order to more fully describe the instant invention the following examples are presented:

EXAMPLE I

*Preparation of a titanium sulfate solution*

An ilmenite ore was ground to −200 mesh and was admixed with concentrated sulfuric acid. Water was then added to the mixture to set off the digestion reaction and a digestion cake was formed rapidly. The cake was dissolved in weak acid. Scrap iron was added to reduce the ferric iron values to the ferrous state. The dissolved cake was then clarified and the clarified solution had the following analysis:

| | |
|---|---|
| Spec. Grav. at 55° C. | 1.531 |
| $TiO_2$ (percent) | 8.9 |
| Acid/$TiO_2$ ratio | 2.12 |
| $FeSO_4$/$TiO_2$ ratio | 2.10 |

*Preparation of anhydrite*

High quality limestone (99.0% $CaCO_3$) was ground and classified and an average particle size of 2.26 microns was obtained. The ground limestone was reacted with sulfuric acid to form a gypsum slurry. The anhydrite was prepared by spraying 15% of the slurry into 60° Bé. $H_2SO_4$ at 40° C. and the remainder of the gypsum slurry was added near the bottom of the tank. After the first 15% of the slurry was added, steaming was started to preheat the gypsum slurry. The total addition time was 60 minutes. The anhydrite formed upon steaming and the anhydrite produced had an average particle size of 0.55 micron.

*Producing a coprecipitated hydrate by precipitation of the titania hydrate in the presence of the anhydrite*

23,800 pounds of the anhydrite produced above which contained 32% solids were repulped with 890 cubic feet of the titanium sulfate solution. A nucleating solution (or yield seed) was added to the mixture. The nucleating solution was prepared by adding 600 cubic feet of the titanium sulfate solution to 190 cubic feet of boiling water. 260 cubic feet of this nucleating solution were added to the titanium sulfate-anhydrite solution. 1070 cubic feet of titanium sulfate solution were then added to the mixture and the mixture was boiled for one hour. An additional 800 cubic feet of the solution were added and the mixture was boiled for an additional 2½ hours. The coprecipitate, consisting of a mixture of titania hydrate and anhydrite, was filtered, bleached and washed well with water to remove the free acid and various impurities from the precipitate.

The washed composite precipitate was treated with 0.025% $Sb_2O_3$ and 0.5% ZnO as conditioning agents and the treated composite hydrate was calcined in a rotary calciner to 910° C. The calcined titanium dioxide-anhydrite composite pigment was then steam milled and the milled product had the following properties:

| | |
|---|---|
| Tinting strength | 1000 |
| Rutile (percent of $TiO_2$) | 95 |
| Color brightness | 94.3 |
| $TiO_2$ (percent) | 50.0 |

*Preparation of the polyvinyl acetate latex paint*

A polyvinyl acetate latex paint was prepared as follows:

To 153.7 grams of demineralized water were added, 0.15 gram of phenyl mercury acetate as a fungicide, 147.9 grams of 2.0% solution of hydroxy ethyl cellulose as a protective colloid, 15.9 grams of ethylene glycol as a freeze-thaw stabilizer, 5.4 grams of a polyglycol ester as a non-ionic surface active agent and 0.41 gram of an anti-foaming agent. The mixture was thoroughly agitated after each addition.

To this mixture 275 grams of pigment containing 2.75 grams of MgO powder, added as a stabilizer to the pigment by dry blending, were added followed by 1.2 ml. of a soybean lecithin as a dispersing agent, and 139.1 grams of a polyvinyl acetate copolymer emulsion. The composite pigment was added slowly to the mixture with moderate agitation followed by rapid agitation for one minute. Lecithin and the emulsion were added slowly with moderate agitation.

It was found that the latex paint prepared above possessed high hiding power and had a long shelf life. The presence of the stabilizing agent prevented the anhydrite from reacting with the various agents in the paint system and it also prevented the formation of gypsum from taking place.

For comparative purposes the same paint formulation was prepared except that no stabilizing agent was added to the formulation. In this paint system the hiding power dropped from 372 to 245 square feet per gallon and gypsum formed upon standing. The following Table I shows clearly the rate of deterioration of the unstabilized paint formulation as compared to the stabilized paint which does not deteriorate upon standing.

TABLE 1

| | Time | Percent Gypsum | Hiding Power |
|---|---|---|---|
| Stabilized Paint (1.0% MgO added). | 1 day | 0 | 404 |
| | 6 months | 0 | 470 |
| Unstabilized Paint | 1 day | 2 | 372 |
| | 6 months | 100 | 245 |

EXAMPLES 2–9

Using the paint formulation described above various stabilizing agents were added in place of the magnesium oxide and in each example the paint was stabilized so that it had satisfactory shelf life.

The results are recorded in Table 2.

TABLE 2

| | Time | Percent Gypsum | Hiding Power |
|---|---|---|---|
| Stabilizing Agent Added: | | | |
| 1.0% $CaSiO_3$ | 1 day | 0 | 520 |
| | 6 months | 0 | 497 |
| 3.0% $CaSiO_3$ | 1 day | 0 | 480 |
| | 6 months | 0 | 506 |
| 1.0% CaO | 1 day | 0 | 384 |
| | 6 months | 0 | 437 |
| 0.5% CaO | 1 day | 0 | 401 |
| | 6 months | 0 | 388 |
| 1.0% $BaSiO_3$ | 1 day | 0 | 384 |
| | 6 months | 1.0 | 372 |
| 1.0% $SrSiO_3$ | 1 day | 0 | 396 |
| | 6 months | <1.0 | 401 |
| 1.0% $Mg(OH)_2$ | 1 day | 0 | 482 |
| | 6 months | 0 | 411 |
| 1.0% $Ca(OH)_2$ | 1 day | 0 | 408 |
| | 6 months | 0 | 362 |

EXAMPLES 10–13

In these examples the composite pigment employed in the same paint formulation contained 30% $TiO_2$ instead of 50% $TiO_2$ and an amount of emulsion adjusted to obtain the same pigment volume concentration (55%). The results are recorded in Table 3 along with a control run which did not contain a stabilizing agent.

TABLE 3

|  | Time | Percent Gypsum | Hiding Power |
|---|---|---|---|
| Unstabilized Paint | 1 day | 2 | 215 |
|  | 3 weeks | 30 |  |
|  | 2 months | 100 | 132 |
| Stabilizing Agent Added: |  |  |  |
| 3.0% CaSiO₃ | 1 day | 0 | 258 |
|  | 18 months | 0 | 263 |
| 6.0% CaSiO₃ | 1 day | 0 | 291 |
|  | 18 months | 0 | 294 |
| 0.2% Ca(OH)₂ | 1 day | 0 | 252 |
|  | 18 months | 0 | 218 |

EXAMPLE 14

In this example the paint formulation described in Example 1 was used except that the stabilizing agent was added to the paint formulation before the pigment was added to the paint. Again the results showed that the treated paint did not deteriorate upon standing. The results are recorded in Table 4.

TABLE 4

|  | Time | Percent Gypsum | Hiding Power |
|---|---|---|---|
| Stabilizing Agent Added: 1.0% MgO | 1 day | 0 | 442 |
|  | 12 months | 0 | 306 |

From the above description and by the examples presented, it has clearly been shown that a polyvinyl acetate latex paint system employing a composite pigment of titanium dioxide and anhydrite can be made to have a satisfactory shelf life provided a stabilizing agent is added both to prevent the anhydrite from reacting with the various agents in the paint formulation, and from converting to gypsum.

The process of the instant invention is simple and economical to employ, particularly since the type of stabilizing agents employed are inexpensive and readily available for use.

While this invention has been described and illustrated by the examples shown, it is not intended to be strictly limited thereto, and other variations and modifications may be employed within the scope of the following claims.

We claim:
1. A polyvinyl acetate latex paint formulation containing a non-ionic surface active agent and a coalesced composite pigment of titanium dioxide and anhydrite, said composite pigment containing from 25%–60% titanium dioxide by weight of said composite pigment, said paint formulation being characterized by having present an anhydrite stabilizing agent to prevent the anhydrite from reacting with the various agents in the paint formulation and to prevent the anhydrite from converting to gypsum, said stabilizing agent selected from the group consisting of calcium silicate, barium silicate, strontium silicate, magnesium oxide, magnesium hydroxide, calcium oxide and calcium hydroxide, the minimum amount of said stabilizing agent being from 0.1% for magnesium oxide and calcium oxide, 0.25% for magnesium hydroxide and calcium silicate and 1.0% for barium silicate, strontium silicate and calcium hydroxide, the maximum amount not to exceed 6%, said amounts based on the weight of said composite pigment.

2. In a polyvinyl acetate latex paint formulation, said formulation containing a non-ionic surface active agent, and a coalesced composite pigment of titanium dioxide and anhydrite, said composite pigment containing from 25% to 60% titanium dioxide by weight of said composite pigment, the improvement which comprises: adding an anhydrite stabilizing agent to prevent the anhydrite from reacting with the various agents in the paint formulation and to prevent the anhydrite from converting to gypsum to said formulation, said stabilizing agent selected from the group consisting of calcium silicate, barium silicate, strontium silicate, magnesium oxide, magnesium hydroxide, calcium oxide and calcium hydroxide, the minimum amount of said stabilizing agent being from 0.1% for magnesium oxide and calcium oxide, 0.25% for magnesium hydroxide and calcium silicate and 1.0% for barium silicate, strontium silicate and calcium hydroxide, the maximum amount not to exceed 6%, said amounts based on the weight of said composite pigment.

3. Process according to claim 2 in which the stabilizing agent is calcium silicate.

4. Process according to claim 2 in which the stabilizing agent is magnesium oxide.

5. Process according to claim 2 in which the stabilizing agent is calcium oxide.

6. Process according to claim 2 in which the stabilizing agent is magnesium hydroxide.

7. Process according to claim 2 in which the stabilizing agent is calcium hydroxide.

8. Process according to claim 2 in which the particle size of the anhydrite in said composite pigment is less than 1 micron.

9. Process according to claim 2 in which the stabilizing agent is added to the composite pigment before the pigment is added to the latex paint formulation.

References Cited

UNITED STATES PATENTS

| 2,365,559 | 12/1944 | Kingsburg et al. | 106—300 |
| 2,887,460 | 5/1959 | Dibert et al. | 260—29.6 |
| 2,944,045 | 7/1960 | Canarios | 260—45.75 |

FOREIGN PATENTS

| 833,583 | 4/1960 | Great Britain. |

SAMUEL H. BLECH, *Primary Examiner.*

MURRAY TILLMAN, *Examiner.*

J. ZIEGLER, *Assistant Examiner.*